(12) United States Patent
Hirano et al.

(10) Patent No.: US 6,279,451 B1
(45) Date of Patent: Aug. 28, 2001

(54) AIR CYLINDER WITH CUSHION MECHANISM

(75) Inventors: Akihiro Hirano; Kenichi Nishimata, both of Ibaraki (JP)

(73) Assignee: SMC Corporation, Tokyo (JP)

(*) Notice: Subject to any disclaimer, the term of this patent is extended or adjusted under 35 U.S.C. 154(b) by 0 days.

(21) Appl. No.: 09/422,080

(22) Filed: Oct. 21, 1999

(30) Foreign Application Priority Data

Nov. 6, 1998 (JP) .................................................. 10-316413

(51) Int. Cl.[7] ............................ F15B 15/22; F15B 11/08; F15B 13/04
(52) U.S. Cl. ................................ 91/405; 91/409; 91/443
(58) Field of Search ............................... 91/405, 406, 409, 91/443, 463

(56) References Cited

U.S. PATENT DOCUMENTS

| | | | |
|---|---|---|---|
| 4,207,800 | * | 6/1980 | Homuth .................................. 91/409 |
| 4,393,751 | | 7/1983 | Kelly . |
| 4,397,218 | * | 8/1983 | Spring .................................... 91/406 |
| 5,284,083 | | 2/1994 | Vaslin . |

FOREIGN PATENT DOCUMENTS

| | | |
|---|---|---|
| 0 004 483 | 10/1979 | (EP) . |
| 698651 | 10/1953 | (GB) . |
| 1 535 873 | 12/1978 | (GB) . |

\* cited by examiner

*Primary Examiner*—Edward K. Look
*Assistant Examiner*—Michael Leslie
(74) *Attorney, Agent, or Firm*—Oblon, Spivak, McClelland, Maier & Neustadt, P.C.

(57) ABSTRACT

A small-sized and inexpensive air cylinder with a cushion mechanism having a simple structure is provided. Therefore, discharge outlets for discharging cushioning air are disposed in positions closer to ends of the stroke than the openings of the ports in the cylinder tube, respectively, and check valves and throttling mechanisms are arranged in parallel between discharge outlets and ports, respectively. On the outer peripheral surface of the piston, one of the piston packing rings is disposed in one position which does not pass through the opening of the port while another of the piston packing rings is disposed in another position which passes through the opening but does not pass through discharge outlet, when the piston reaches the terminal ends of the stroke.

6 Claims, 6 Drawing Sheets

AIR CYLINDER WITH CUSHION MECHANISM

TECHNICAL FIELD

The present invention relates to an air cylinder having a cushion mechanism for absorbing a shock due to the energy of inertia when a piston of the cylinder stops at the stroke terminal end thereof.

DESCRIPTION OF THE RELATED ART

In an air cylinder having a cylinder tube and a piston sliding within the cylinder tube, a cushion mechanism has been well known in which cushioning air is temporarily encupsulated in an air chamber in the exhaust side to be pressurized during the piston operation to thereby decelerate the piston using the exhaust-air pressure, resulting in stopping it in a cushioning manner at the stroke end. In this conventional air cylinder, an air discharge path is blocked by inserting a cushion ring disposed in the piston side into cushion packing within the piston tube before the stroke end so as to lead the discharging air to a throttle valve. Thereby, the back pressure of the piston converts the kinetic energy of the piston to the air compressing energy in accordance with the throttling adjustment of the throttle valve, exerting a decelerating force.

However, in the above-described conventional air cylinder with a cushion mechanism, since it is needed for the structural reason of the cushion mechanism that a required length of the cushion ring be disposed in at least one side of the piston and a long empty room for inserting the cushion ring be disposed in the cylinder tube, a problem that the longitudinal length of the cylinder is inevitably increased is indicated.

SUMMARY OF THE INVENTION

It is a main technical problem to be solved by the present invention to provide an air cylinder with a cushion mechanism which is small-sized, simple in construction, and inexpensive as well by eliminating the long cushion ring and the empty room for inserting thereinto.

It is another technical problem to be solved by the present invention to provide an air cylinder with a cushion mechanism which is simple and rationally designed as well in construction, having only means for restraining discharging air flow in the cylinder tube side and plural numbers of packing for piston-packing and cushion-packing in common disposed in the piston.

In order to solve the above-mentioned problems, an air cylinder with a cushion mechanism according to the present invention including a cylinder tube; a piston sliding within the cylinder tube; and two ports for supplying and discharging compressed air to and from two pressure chambers separated by the piston, respectively, the air cylinder comprises a discharge outlet for communicating with the pressure chamber disposed in a position corresponding to at least one of the two ports in the cylinder tube to be positioned closer to the end of the cylinder tube than the port; speed-regulating means for stopping the piston in a cushioning manner by restraining the flow of discharging air from the pressure chamber, connected to the discharge outlet; and a plurality of piston packing rings for defining the two pressure chambers by touching and sliding on the inner peripheral surface of the cylinder tube, disposed in the outer peripheral surface of the piston, wherein at least a part number of the plurality of piston packing rings serve the function as cushion packing in common by discharging compressed air within the pressure chamber only through the discharge outlet when they pass-through over the port in the discharge side just before the piston reaches the stroke end.

In the air cylinder formed as described above, the piston is driven in the positive and reverse directions by alternately supplying and discharging compressed air through the two ports. The deceleration and stopping of the piston by the cushion mechanism at the stroke end are performed as follows. When the piston is sliding, the compressed air in the pressure chamber in the discharge side is discharged via the port in the beginning. Then, when the piston approaches the stroke end and the piston packing ring serving the function as cushion packing in common passes through over the port in the discharge side, the path between the port and the pressure chamber is intercepted, so that the compressed air in the pressure chamber in the discharge side is discharged in a restraining manner only through the discharge outlet via the speed-regulating means. Thereby, the air pressure in the pressure chamber is increased by the flow control of the speed-regulating means so as to be back-pressure against the piston, such that the piston reaches the terminal end of the stroke while being decelerated.

The above-described air cylinder with a cushion mechanism is not needed to form a long cushion ring and a long empty room for inserting the cushion ring, so that the longitudinal length of the cylinder can be reduced to that extent, resulting in enabling the air cylinder to be miniaturized.

Moreover, since the speed-regulating means for restraining the discharging air flow is disposed in the cylinder tube side and plural packing rings substantially serving the function as piston packing and cushioning packing in common are formed in the piston side, the designed structure thereof can be simplified by reducing the number of parts and rationalized as well to thereby reduce the manufacturing cost of the air cylinder.

In an air cylinder according to the present invention, the discharge outlet may be connected to the corresponding port via the speed-regulating means.

In a specific embodiment of an air cylinder according to the present invention, the speed-regulating means may comprise a throttling mechanism for restraining the flow of discharging air flowing from the discharge outlet toward the port side and a check valve which stops the flow of discharging air flowing from the discharge outlet toward the port side while allows the flow of compressed air in the opposite direction thereto.

In a preferred embodiment of an air cylinder according to the present invention, the speed-regulating means may be assembled in a valve chamber formed in the cylinder tube for communicating with the discharge outlet and the port, by accommodating a valve member having the throttling mechanism therein interposing a lip seal forming the check valve therebetween.

In another embodiment of an air cylinder according to the present invention, the speed-regulating means may be formed of a throttling mechanism for restraining the flow of discharging air flowing from the discharge outlet toward the port side, and wherein a part number of the plurality of piston packing rings serving the function as cushion packing in common may serve the function as a check valve in common which allows the flow of discharging compressed air flowing from the port side toward the discharge outlet side while stops the flow in the opposite direction thereto when they are positioned between the port and the discharge outlet at the stroke end.

In the present invention, in order to stop the piston in a decelerating manner at the both stroke ends in the positive and reverse sides, two sets of the discharge outlet, the speed-regulating means, and the piston packing ring serving the function as cushion packing in common may be disposed corresponding to the two ports.

DETAILED DESCRIPTION OF THE PREFERRED EMBODIMENT

Figure 1:
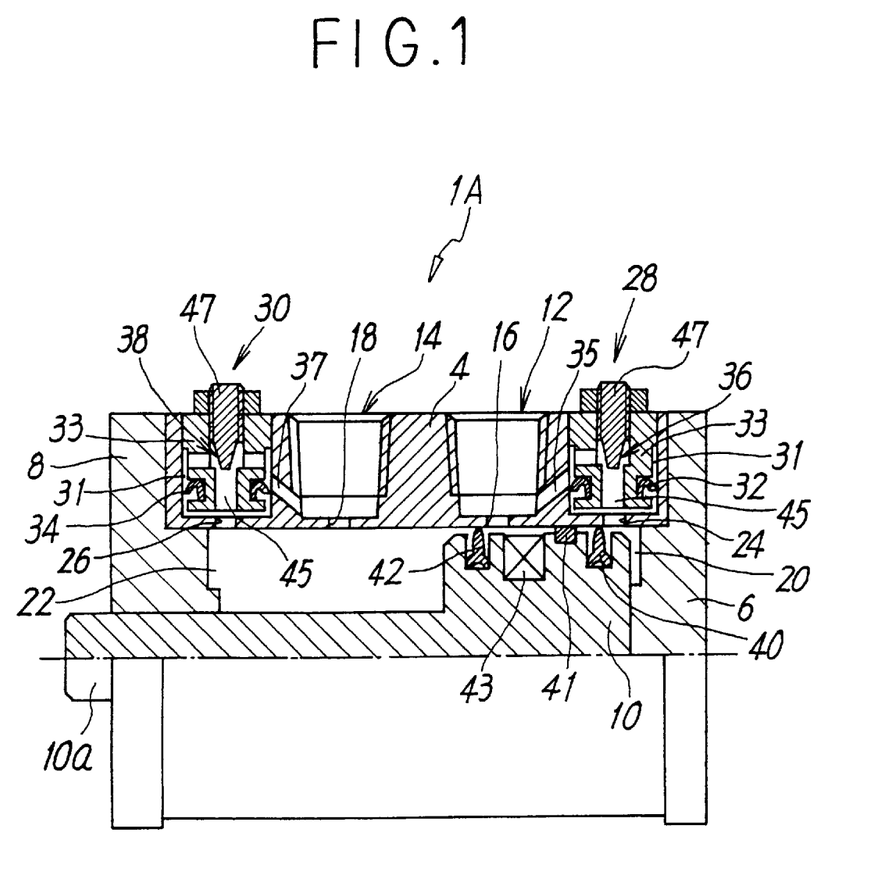
FIG. 1 is an upper-half portion side-sectional and broken view of a first embodiment of an air cylinder with a cushion mechanism according to the present invention, showing the state before the piston is driven.
Figure 2:
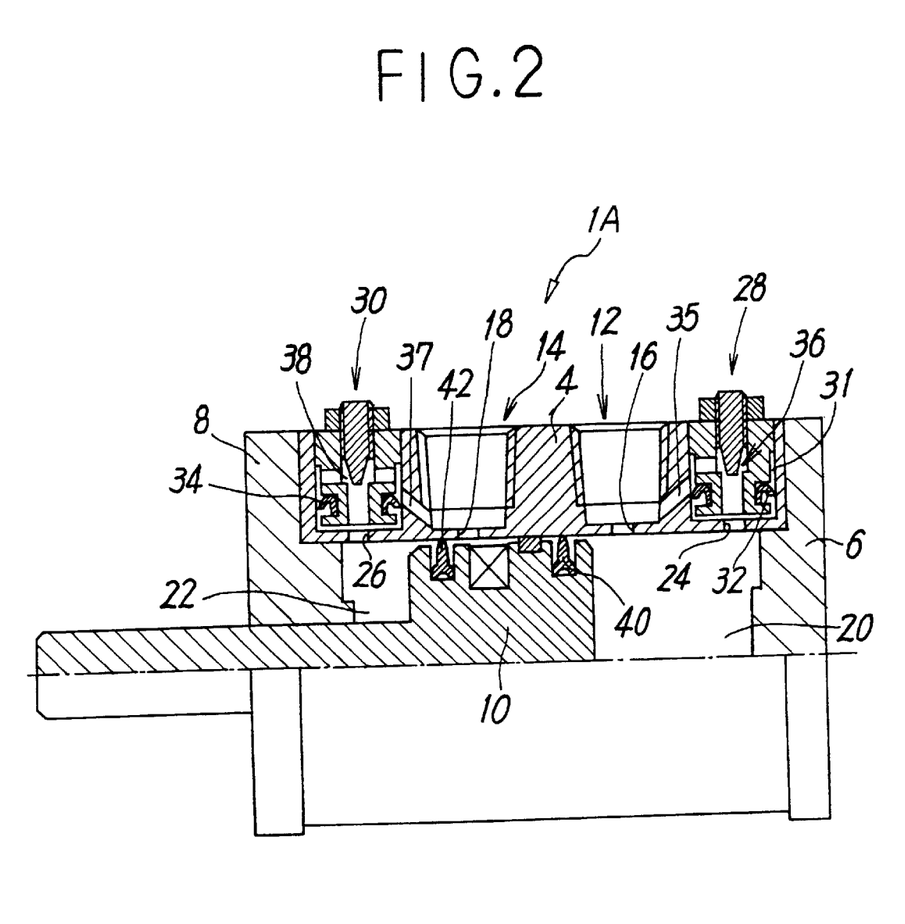
FIG. 2 is a side-sectional view showing a cushioning process of the above-mentioned first embodiment.

FIGS. 1 and 2 show a first embodiment of an air cylinder with a cushion mechanism according to the present invention. The air cylinder 1A includes a cylinder tube 4, both ends thereof being blockaded by a head cover 6 and a rod cover 8, respectively, a piston 10 which reciprocates within the cylinder tube 4 sliding air-tightly, and a piston rod 10a connected to the piston 10.

In the vicinities of ends in the head and rod sides of the cylinder tube 4, two ports 12 and 14 for supplying and discharging compressed air are disposed, respectively. These ports 12 and 14 communicate with a pair of pressure chambers 20 and 22 defined in the both sides of the piston 10, via openings 16 and 18, respectively. The piston 10 is driven to be reciprocated in the cylinder tube 4 by supplying and discharging compressed air to/from the pressure chambers 20 and 22 from/to the ports 12 and 14 via the openings 16 and 18, respectively. In the substantial end portions of the cylinder tube 4 closer to the terminal ends of the stroke than the openings 16 and 18, discharge outlets 24 and 26 for discharging cushioning air from each of the pressure chambers 20 and 22 are disposed, respectively. Between these discharge outlets 24 and 26 and the ports 12 and 14, speed-regulating means 28 and 30 for deceleratingly stopping the piston by restraining the discharging airflow are connected thereto, respectively.

This speed-regulating means 28 (30) is formed by a parallel arrangement of a check valve 32 (34) and a throttling mechanism 36 (38) for restraining the airflow, and is accommodated within a valve chamber 31 formed in the cylinder tube 4. That is, in a position of the cylinder tube 4 corresponding to that of the discharge outlet 24 (26), the above-mentioned valve chamber 31 communicating with both the discharge outlet 24 (26) and the port 12 (14) is formed, in which a cylindrical-shaped valve member 33 is accommodated. In the valve member 33, the above-mentioned throttling mechanism 36 (38) is disposed and a lip seal forming the above-mentioned check valve 32 (34) lies between the outer peripheral surface of the valve member 33 and the inner peripheral surface of the valve chamber 31 as well. In the drawings, numeral 35 (37) denotes a by-pass connecting the above-mentioned valve chamber 31 to the port 12 (14).

The above-mentioned throttling mechanism 36 (38) is formed as a variable throttle valve including a communicating hole 45 connecting the discharge outlet 24 (26) to the port 12 (14) via the above-mentioned by-pass 35 (37), and a needle 47 for adjusting the opening area of the communicating hole 45. On the other hand, the above-mentioned check valve 32 (34) stops the compressed airflow from the pressure chamber 20 (22) toward the port 12 (14) side at the cushioning step in the stroke terminal end side of the piston 10, and it allows only the inflow of the compressed air from the port 12 (14) to the pressure chamber 20 (22) when the piston 10 starts to be driven.

On the outer surface of the piston 10, two piston-packing rings 40 and 42 for defining the above-mentioned pressure chambers 20 and 22 are disposed so as to touch and slide on the inner surface of the cylinder tube 4. These piston-packing rings 40 and 42 serve a double function that is not only defining the pressure chambers 20 and 22 but also switching discharging paths, i.e., enabling to discharge the pressurized air in the pressure chambers 20 and 22 only through the discharge outlets 24 and 26 by passing-through over the port in the discharge side just before the piston 10 reaches the stroke end as a cushioning-packing function. Each of the ports 12 and 14 is located in the following position relative to that of each of the discharge outlets 24 and 26. That is, the piston-packing rings 40 and 42 are located in a positional relationship that when the piston 10 reaches each of terminal ends of the stroke by sliding toward the head side or the rod side, the piston-packing ring 40 or 42 in the front side of the moving direction passes-through over the opening 16 or 18 of the port 12 or 14 in the discharge side but stops before passing-through over the discharge outlet 24 or 26, while the piston-packing ring 40 or 42 in the rear side of the moving direction stops just before passing-through over the opening 16 or 18 of the port 12 or 14 in the discharge side.

Operations of the air cylinder with a cushion mechanism 1A formed as described above will be described in detail with reference to the drawings.

In a state that the piston 10 is located in the head-side end of the stroke as shown in FIG. 1, when compressed air is supplied to the one port 12, since the air flows into the valve chamber 31 through the by-pass 35 so as to flow into the pressure chamber 20 in the head side from the discharge outlet 24 by opening the check valve 32, the piston 10 starts toward the rod side (the left side viewing the drawing). Then, when the piston-packing ring 40 in the rear side of the moving direction of the piston 10 passes-through over the opening 16 of the port 12, the above-mentioned compressed air is mainly supplied directly to the pressure chamber 20 via the opening 16, so that the piston 10 continues the moving as it is. In accordance with the movement, compressed air within the pressure chamber 22 in the rod side is mainly discharged directly from the opening 18 via the port 14.

As shown in FIG. 2, when the piston 10 approaches the rod-side end of the stroke, so that the piston-packing ring 42 in the front side of the moving direction passes through the above-mentioned the opening 18 (that is, the port 14), the pressure chamber 22 in the discharge side is shut-off from the port 14, such that the compressed air within the pressure chamber 22 is to be discharged from the discharge outlet 26 through the throttling mechanism 38 of the speed-regulating means 30. That is, this piston-packing ring 42 functions as cushioning packing so that the discharging path is switched from the direct path via the opening 18 and the port 14 to the restraining path via the discharge outlet 26 and the throttling mechanism 38. Therefore, the air pressure of the pressure chamber 22 is increased due to the flow control by the throttling mechanism 38 so as to be back-pressure against the piston, such that the piston 10 reaches the terminal end of the stroke while being decelerated. At this time, the piston-packing ring 42 in the front side of the moving direction stops before the discharge outlet 26 while the piston-packing ring 40 in the rear side stops before the opening 18 of the port 14.

When the piston 10 is slid from the rod-side end of the stroke toward the head-side end of the stroke in the opposite direction to the above-mentioned one, compressed air is supplied to the port 14. At this time, when the piston 10 approaches the head-side end of the stroke, since the piston-packing ring 40 functions as cushioning packing so that the discharging path from the pressure chamber 20 in the head side is switched from the direct path via the port 12 to the restraining path via the discharge outlet 24 and the throttling mechanism 36 of the speed-regulating means 28, the piston 10 stops in a cushioning manner at the head-side end of the stroke while being decelerated.

The air cylinder with a cushion mechanism formed as described above is not needed to form a long cushion ring in the piston and a long empty room for inserting the cushion ring within the cylinder as a conventional one, so that the longitudinal length of the cylinder tube 4 can be reduced to that extent, resulting in enabling the air cylinder to be miniaturized.

Moreover, since the piston-packing rings 40 and 42 are formed to serve the function as cushioning packing in common substantially, the configuration thereof can be simplified by reducing the number of parts of the air cylinder to thereby reduce the manufacturing cost.

In the drawings, numeral 41 denotes a wear-ring and numeral 43 represents a magnet for position detecting; these are formed as the necessity arises.

Figure 3:
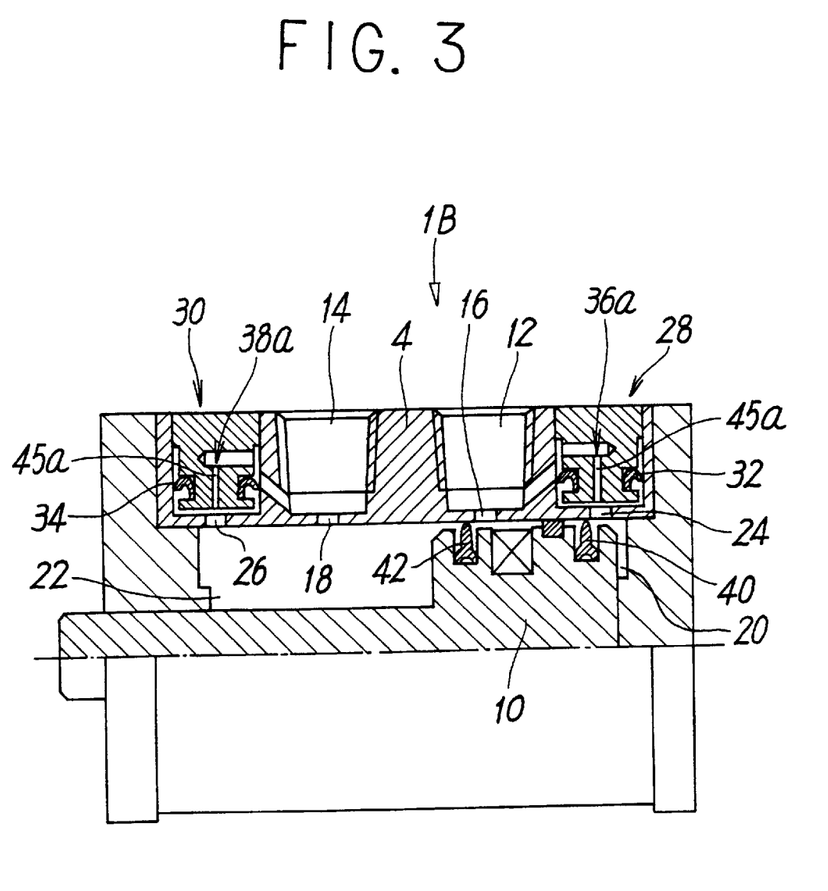
FIG. 3 is an upper-half portion side-sectional and broken view of a second embodiment of the present invention.

FIG. 3 illustrates a second embodiment according to the present invention. An air cylinder 1B in the second embodiment is different from that of the first embodiment in that throttling mechanisms 36a and 38a in speed-regulating means 28 and 30 are formed to be fixed throttling in which the opening area of a communicating hole 45a cannot be adjusted.

Since the configuration and operations in the second embodiment is substantially identical to those in the first embodiment except as set forth above, like reference characters designate like main functional portions common to each embodiment with the description thereof omitted for brevity.

Figure 4:
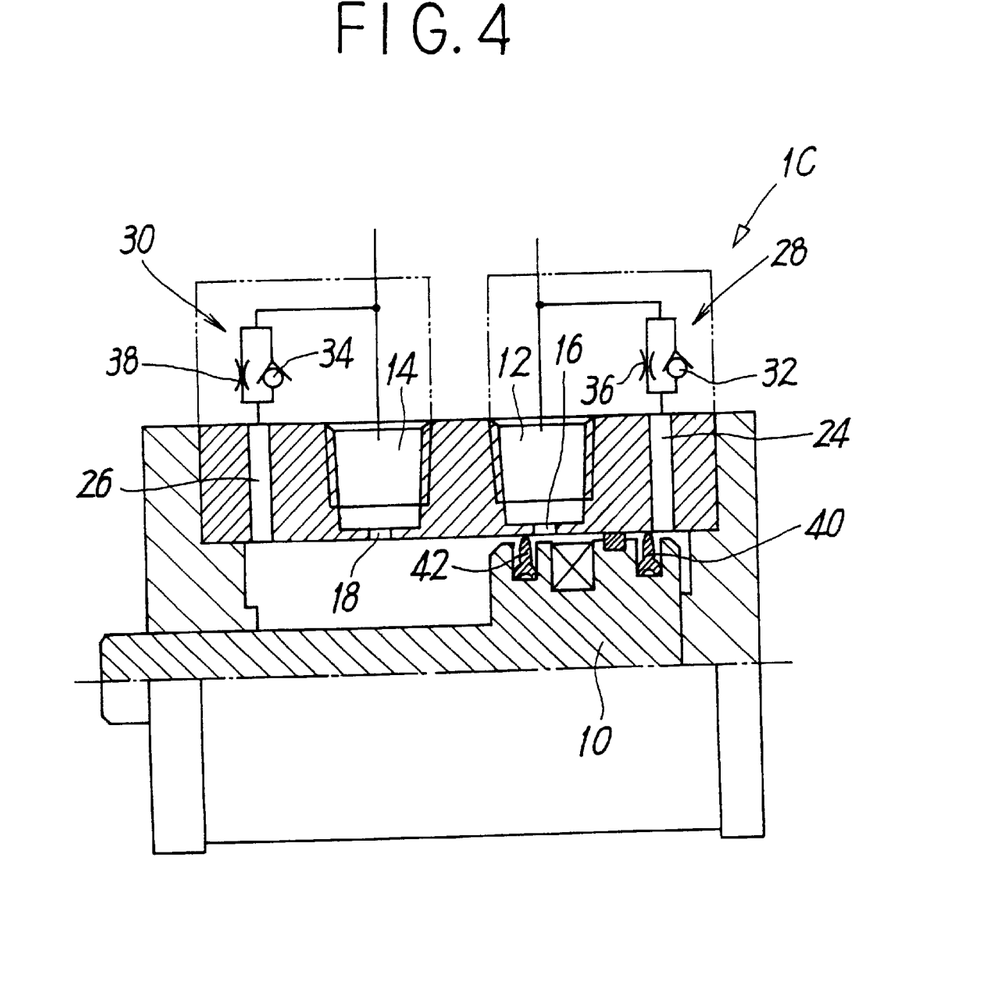
FIG. 4 is an upper-half portion side-sectional and broken view of a third embodiment of the present invention.

FIG. 4 illustrates a third embodiment according to the present invention. An air cylinder 1C in the third embodiment is different from those of the above-described first and second embodiments in that while speed-regulating means 28 and 30 are directly assembled within the valve chambers 31 formed in the cylinder tube 4 in the first and second embodiments, in this third embodiment, speed-regulating means 28 and 30 are arranged outside of the cylinder tube 4, which are connected to the discharge outlets 24 and 26 and the ports 12 and 14. In this case, a block to which speed-regulating means 28 and 30 are assembled may be either fixed to the cylinder tube 4 or arranged in a place separated from the cylinder tube 4 to be connected to each other by piping. The throttling mechanisms 36a and 38a may be either a variable throttling type as in the first embodiment or a fixed throttling type as in the second embodiment.

The configuration and operations in the third embodiment is substantially identical to those in the first and second embodiments except as set forth above.

Figure 5:
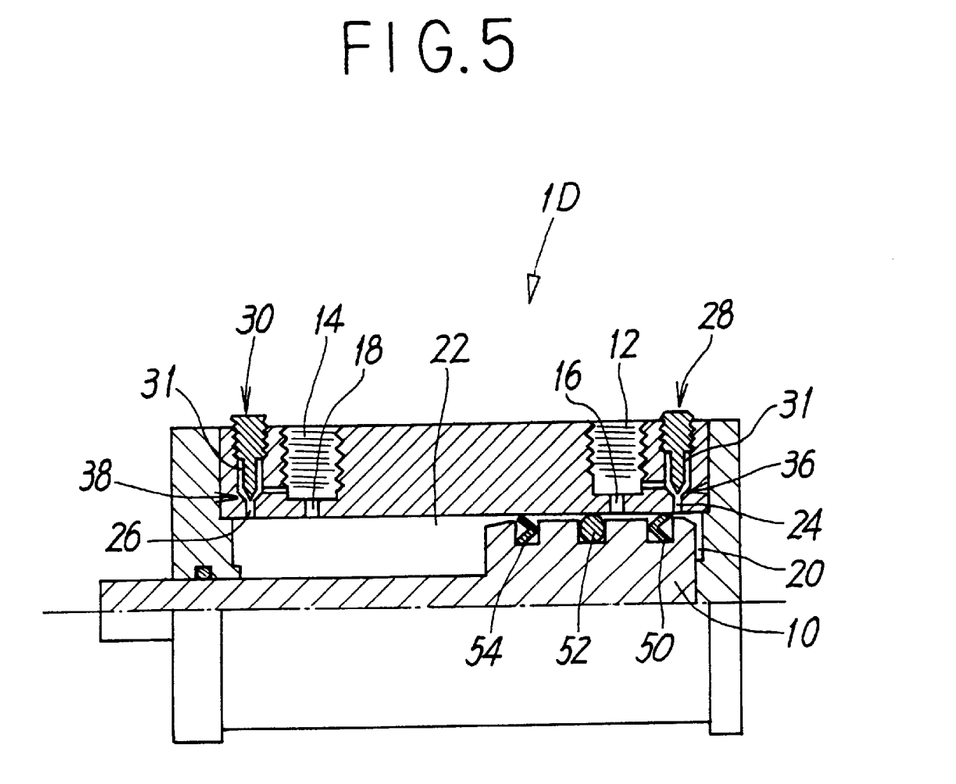
FIG. 5 is an upper-half portion side-sectional and broken view of a fourth embodiment of the present invention.

FIG. 5 illustrates a fourth embodiment according to the present invention. An air cylinder 1D in the fourth embodiment is different from those of the above-described first and second embodiments in that only the throttling mechanisms 36 and 38 as speed-regulating means 28 and 30 are accommodated within the valve chambers 31 between the discharge outlets 24 and 26 and the ports 12 and 14, respectively, and the function as the check valve is to be served in common by a part number of three piston packing rings 50, 52, and 54 attached to the piston 10.

That is, the above-described three piston-packing rings 50, 52, and 54 are fixed to the outer surface of the piston 10, wherein the center packing ring 52 serves only to define the two pressure chambers 20 and 22 as the original piston-packing function while other two packing rings 50 and 54 in both sides serve the function as cushioning packing and a check valve in common other than the function as piston-packing. Therefore, these two packing rings 50 and 54 are formed to be a lip seal type having an oriented shape in sealing and attached to the outer surface of the piston 10 so that compressed air is allowed to flow in the directions toward both ends of the piston 10 from the center packing ring 52 side while is stopped in the opposite directions thereto. The designed positional relationship among the above-mentioned three packing rings 50, 52, and 54 is that when the piston 10 reaches the stroke end, the packing ring 50 or 54 in the front side stops before the discharge outlet 24 or 26 while the intermediate packing ring 52 stops before the opening 16 or 18 of the port 12 or 14.

In the fourth embodiment, in the state shown in FIG. 5, when compressed air is supplied to the port 12, the compressed air mainly flows in the clearance of the outer surface of the piston 10 from the opening 16 so as to enter the pressure chamber 20 by extending the packing ring 50 by force, although it also flows in the pressure chamber 20 from the throttling mechanism 36 adding gradually, so that the piston 10 can start at the expected speed.

After the above-mentioned packing ring 50 passed through the opening 16 of the port 12 by the some movement of the piston 10, the compressed air from the port 12 directly flows in the pressure chamber 20 through the opening 16 and afterward the packing ring 50 functions as piston packing maintaining air-tightness of the pressure chamber 20.

When the piston 10 approaches the stroke end, the packing ring 54 in the front side of the moving direction functions as cushioning packing, that is, just like in the first embodiment, the discharging path is switched from the path via the opening 18 of the port 14 to the path via the throttling mechanism 38, so that the piston 10 is stopped in a cushioning manner at the stroke end.

Also, in the fourth embodiment, the above-mentioned throttling mechanism 38 may be either a variable throttling type or a fixed throttling type.

Figure 6:
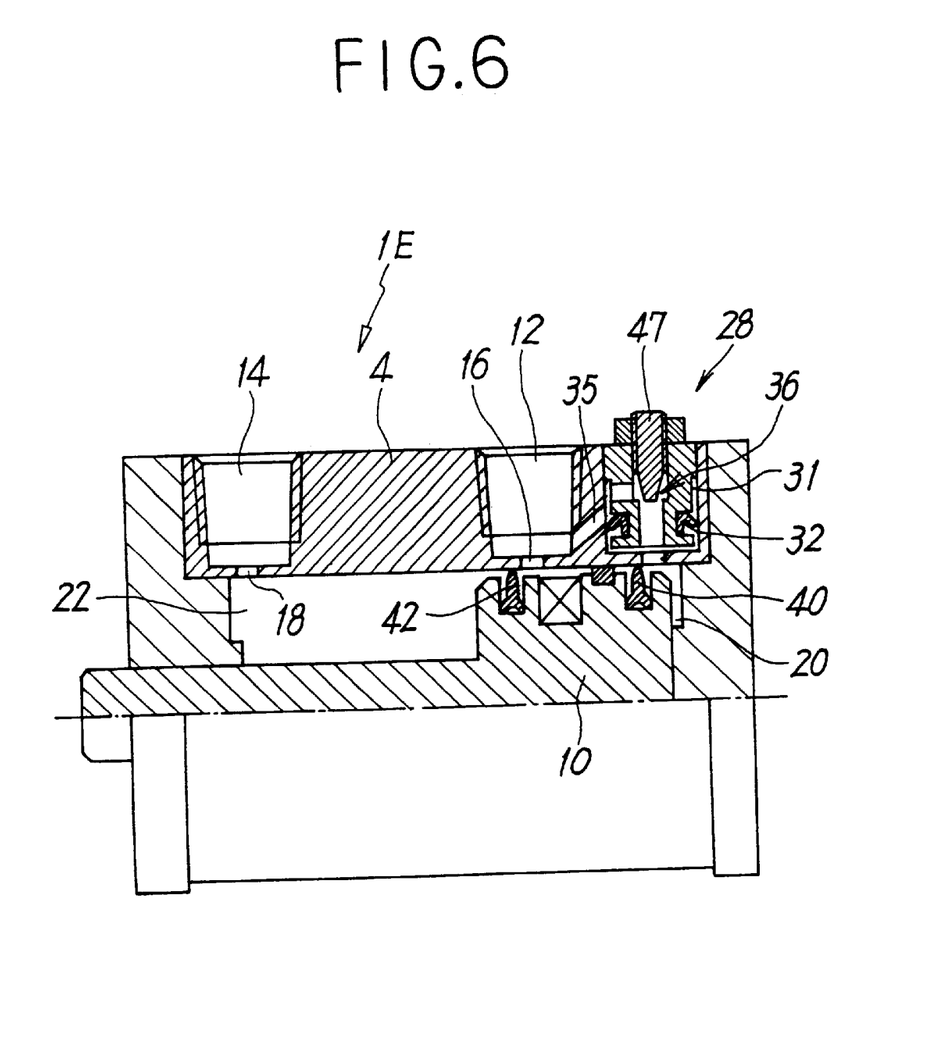
FIG. 6 is an upper-half portion side-sectional and broken view of a fifth embodiment of the present invention.

FIG. 6 illustrates a fifth embodiment according to the present invention. An air cylinder 1E in the fifth embodiment is formed so as to stop the piston 10 at one end of the stroke by arranging speed-regulating means at any one end of the cylinder being different from those of the above-described quoted examples having speed-regulating means 28 and 30 in the stroke ends in the both positive and reverse sides.

In addition, FIG. 6 typically illustrates the state in which speed-regulating means 28 is arranged in the head-side stroke end.

In the fifth embodiment, the packing ring 40 in the two packing rings 40 and 42 attached in the piston 10 is disposed in the side in which speed-regulating means 28 is arranged so as to serve the function as piston packing and cushion packing in common while the packing ring 42 in the opposite side functions only as piston packing.

In addition, FIG. 6 shows speed-regulating means 28 as a configuration corresponding to the first embodiment; it may be formed to correspond to any of the second to fourth embodiments. However, when speed-regulating means 28 is formed to correspond to the fourth embodiment, among three packing rings 50, 52, and 54 shown in FIG. 5, the packing ring 54 disposed in the end side in which speed-regulating means is not arranged is omitted.

The air cylinder with a cushion mechanism according to the present invention is not needed to form a long cushion ring in the piston and a long empty room for inserting the cushion ring, so that the longitudinal length of the cylinder can be reduced to that extent, resulting in enabling the air cylinder to be miniaturized.

Moreover, since the piston-packing rings are formed to serve the function as cushioning packing in common substantially, the configuration thereof can be simplified by reducing the number of parts of the air cylinder to thereby reduce the manufacturing cost thereof.

What we claim are:

1. An air cylinder comprising:

a cylinder tube, a piston sliding within the cylinder tube, first and second ports for respectively supplying and discharging compressed air to and from two pressure chambers separated by the piston, respectively, a discharge outlet for communicating with each pressure chamber, said discharge outlet being positioned closer to an end of said cylinder tube than an associated port of said chamber, a speed regulating mechanism comprising a throttling mechanism connected to a discharge outlet for stopping said piston in a cushioned manner by restraining the flow of discharging air from a first pressure chamber, and first and second piston packing rings disposed on the outer peripheral surface of said piston for defining two pressure chambers by contacting the inner peripheral surface of said cylinder tube, wherein said piston packing rings are situated such that, when said piston reaches the end of a stroke, said first packing ring, which is forward in said stroke direction, passes over said first port, but stops before a first discharge outlet and said second packing ring, which is rearward of the first packing ring in said stroke direction, stops before said first port, such that said piston packing rings also function, respectively, as cushion packings by discharging compressed air within one of said pressure chambers only through a discharge outlet.

2. An air cylinder according to claim 1, wherein said discharge outlet is connected to the associated port via a throttling mechanism, wherein a check valve is positioned in parallel with the throttling mechanism and stops the flow of discharging air flowing from said discharge outlet toward the port side but allows the flow of compressed air in the opposite direction.

3. An air cylinder according to claim 2, wherein a valve chamber for communicating with said discharge outlet and a by-pass connecting the valve chamber to a port are formed at positions in proximity with the port in the side of the cylinder tube, and a valve member having a throttling mechanism is positioned in a valve chamber with a lip seal forming a check valve interposed therebetween.

4. An air cylinder according to claim 3, wherein said speed-regulating mechanism is positioned in a valve chamber formed in the cylinder tube for communicating with said discharge outlet and a port, by accommodating a valve member having the throttling mechanism therein interposing a lip seal forming the check valve therebetween.

5. An air cylinder according to claim 2, wherein said speed-regulating mechanism comprises a throttling mechanism for restraining the flow of discharging air flowing from said discharge outlet toward the port side, and wherein a least one of said plurality of piston packing rings also comprises a check valve which allows the flow of discharging compressed air flowing from the port side toward said discharge outlet side while stopping the flow in the opposite direction thereto when said piston packing rings are positioned between the port and said discharge outlet at the stroke end.

6. An air cylinder according to claim 1, wherein, for stopping the piston in a decelerating manner at the both stroke ends in the positive and reverse sides, two sets of said discharge outlets, said speed regulating mechanism, and said piston packing rings are positioned corresponding to said first and second ports.

* * * * *